W. B. WHERRY.
MAIL CART.
APPLICATION FILED MAY 21, 1910.
974,729.
Patented Nov. 1, 1910.
2 SHEETS—SHEET 2.
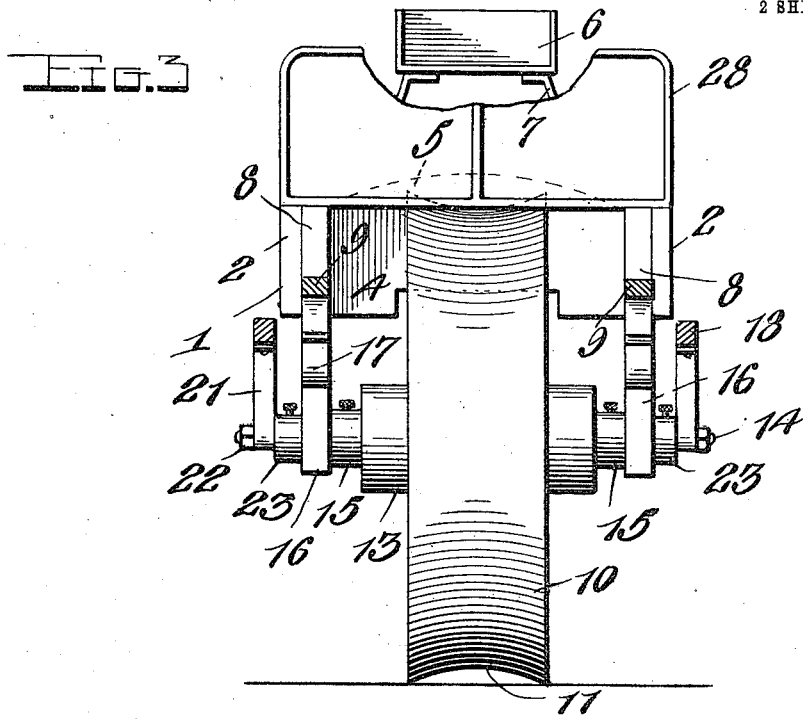
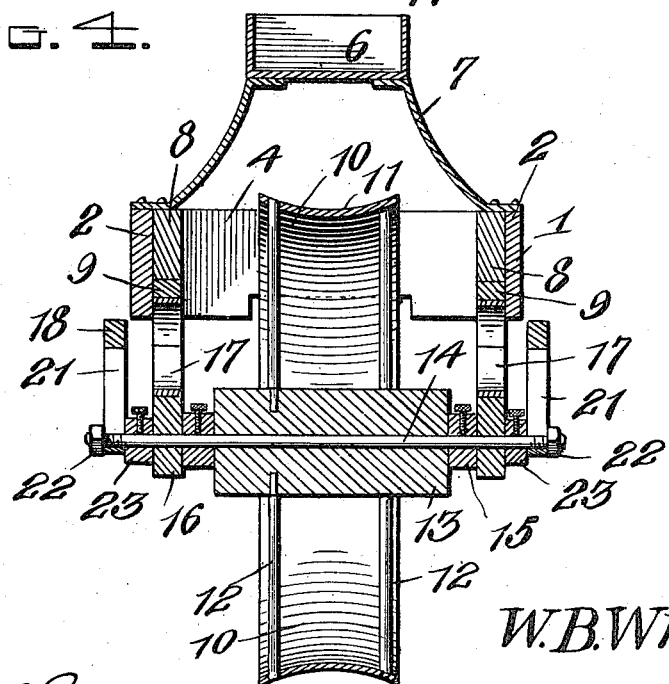
Witnesses
Chas. L. Griesbauer
E. M. Ricketts
Inventor
W. B. Wherry,
By Watson E. Coleman,
Attorney

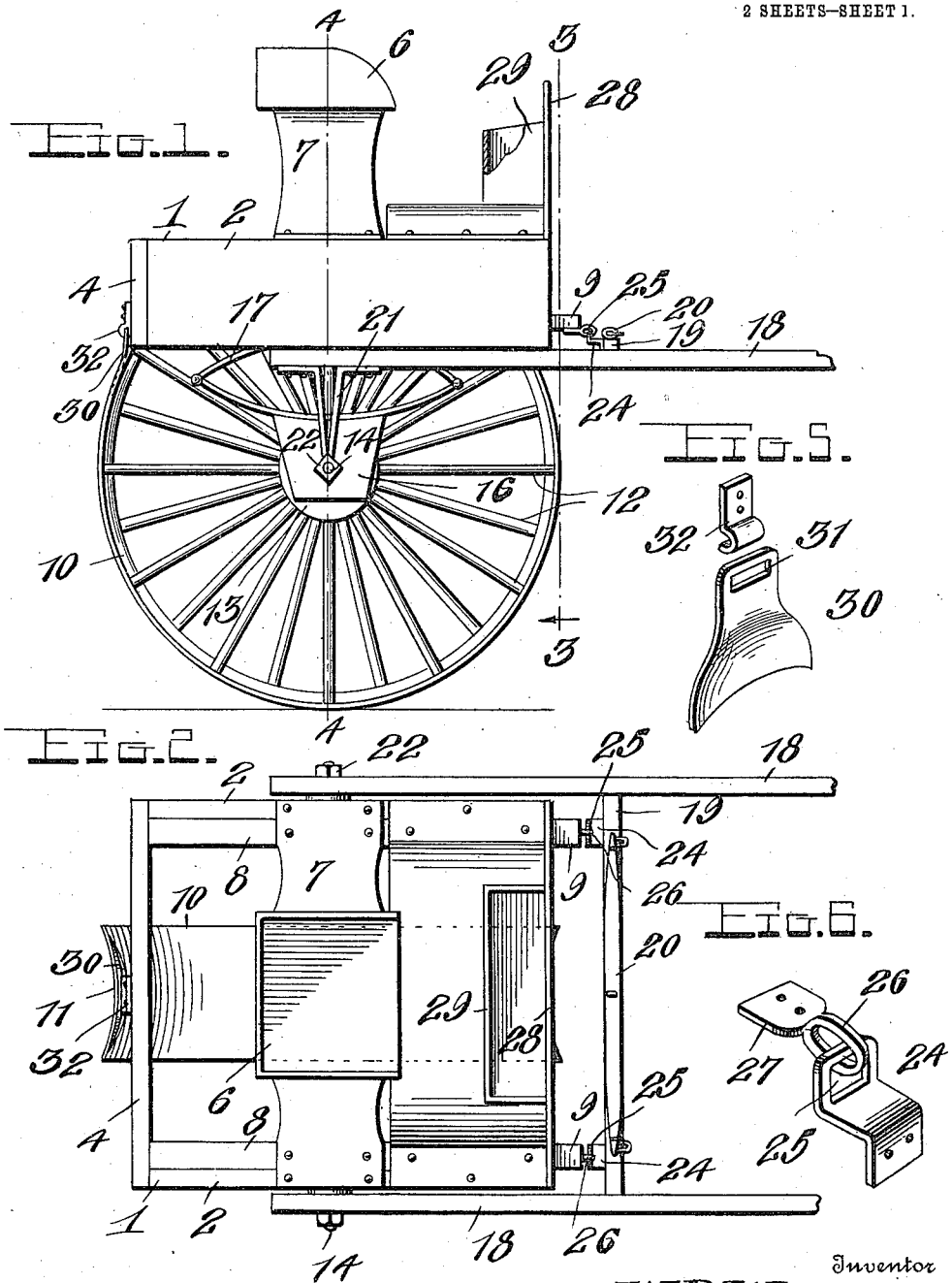

UNITED STATES PATENT OFFICE.

WILLIAM B. WHERRY, OF OVERTON, TEXAS.

MAIL-CART.

974,729. Specification of Letters Patent. Patented Nov. 1, 1910.

Application filed May 21, 1910. Serial No. 562,666.

*To all whom it may concern:*

Be it known that I, WILLIAM B. WHERRY, a citizen of the United States, residing at Overton, in the county of Rusk and State of Texas, have invented certain new and useful Improvements in Mail-Carts, of which the following is a specification, reference being had to the accompanying drawings.

This invention relates to an improved one wheel cart which is especially adapted for use in carrying mail on rural delivery routes but which may be used for other purposes.

The object of the invention is to provide an improved cart of this character which will be of simple and inexpensive construction, which will travel over muddy and sandy roads without much draft on the animal and which has its single ground wheel provided with a broad concave periphery or rim supported by two rows of spokes and adapted to compress the mud or sand over which it travels and thereby prevent sinking into the road or ground over which the cart is drawn.

With the above and other objects in view, the invention consists of the novel construction, combination and arrangement of parts, hereinafter fully described and claimed, and illustrated in the accompanying drawings in which:—

Figure 1 is a side elevation of my improved mail cart; Fig. 2 is a top plan view; Figs. 3 and 4 are cross sectional views taken respectively on the lines 3—3 and 4—4 in Fig. 1; Fig. 5 is a detail perspective view showing parts of the scraper; and Fig. 6 is a similar view showing the link connection between the body of the cart and the draft device or gear.

My improved cart comprises a rectangular body 1 composed of side plates or bars 2 united by a rear cross bar 4 and by a front top plate 5 which latter serves as a foot platform for the rider. The latter occupies a seat 6 arranged on two upwardly and inwardly inclined standards or brackets 7 the lower ends of which are secured to the central portions of the side bars 2 and also to inner reinforcing side bars 8 which latter are arranged on the inner faces of the bars 2 and have secured to their bottom edges forwardly projecting connecting bars 9.

The body of the cart is arranged over a single ground wheel 10 which has a very broad rim or periphery 11 the outer surface of which is concave whereby mud, sand or other loose ground over which the wheel passes will be compacted or compressed beneath the wheel and consequently the wheel will not sink down into the road or ground and there will be no excessive draft on the animal. This concave rim 11 is connected by two annular series of radially arranged spokes 12 the inner ends of which are fixed in a cylindrical hub 13 loosely mounted on a transverse axle 14 and prevented from having endwise movement thereon by stop collars 15 which are made adjustable by providing them with set screws, as shown in Fig. 4. The axle or shaft 14 has its end portions rotatable in bearing blocks 16 fixed to the lower ends of elliptical springs 17 the upper portions of which are fixed to the connecting bars 9 of the body of the cart.

18 denotes a pair of shafts or thills the intermediate portions of which are connected by a cross bar 19 on the center of which is pivoted a swingletree 20 to which the draft animal is hitched. The rear end portions of the thills 18 have fastened to their bottom faces depending hanger brackets 21 formed from metal straps which are bent substantially in the form of the letter V, provided with openings at their lower ends which receive the axle 14 and have their end portions diverged and bent in opposite direction for attachment to the thills 18, as will be understood on reference to Fig. 1. The hangers 21 are secured on the axle 14 by retaining nuts 22 arranged on the extremities of said axle, and between the said brackets or hangers and the bars 16 are arranged stop collars 23 which are similar to the collar 15 and are made adjustable by means of set screws, see Fig. 4. Owing to this construction it will be seen that the thills 18 may have a limited vertical swinging movement with the animal and the cart body 1 may likewise have limited swinging movement from the axle and also vertical movement by reason of the supporting springs 17, but in order to prevent the cart body 1 from tilting forwardly or rearwardly to an excessive extent, loose connections are provided between the forward projecting ends of the connecting bars 9 and the thill cross bar 19. These loose connections preferably consist of angular plates 24 secured to the cross bar 19 and having open end portions 25 to receive loops or eyes 26 on plates 27 which latter are secured to the bars 9, see Figs. 1 and 6. If desired at the front of the body of the cart I may provide an upright dash board 28 and a box or receptacle 29 in which the mail carrier may place the mail.

In order to prevent mud from adhering to the concave periphery or rim of the wheel 10 I provide a scraper which may consist of a concave plate 30 having an enlarged curved end to run in the concave outer surface of the wheel rim and a reduced slotted upper portion 31 to receive an attaching plate 32 secured to the rear cross bar 4 of the body of the cart whereby the scraper plate 30 will move downwardly and have swinging movement.

From the foregoing it will be seen that by constructing the cart as set forth and providing it with a single supporting wheel having a broad concave periphery or rim and arranging the driver's seat immediately above the center of the wheel, that an animal may draw the cart wherever it can travel and over mud, sand or rough roads with comparatively little effort. The peculiar shape of the wheel prevents it from sinking into mud or sand and increasing the draft on the animal and the peculiar construction of the cart not only renders it light in weight and strong and durable in use, but also makes the riding exceedingly easy and comfortable for the driver.

Various changes in the form, proportion and arrangement of parts and in the details of construction may be resorted to within the spirit and scope of the invention.

What is claimed is:

1. A cart of the character described comprising an axle, a wheel centrally arranged on said axle, bearings on the axle near its ends, a body, springs on said bearings and connected to and supporting the body, a draft device connected directly to the ends of the axle and connections between said draft device and said body to prevent excessive forward and rearward rocking motion of the latter.

2. A cart of the character described comprising an axle, a spring supported body mounted on the axle for swinging movement, a single supporting wheel arranged on the axle directly beneath the body, a pair of connected thills having hangers connected to the end portions of the axle whereby the thills may have vertical movement, and loose connections between the thills and the front portion of the body.

3. A cart of the character described comprising an axle, bearings thereon, springs on said bearings, rectangular cart body fixed to said springs, a seat arranged centrally on the body and disposed over said axle, a single ground wheel for supporting the body, said wheel being fixed to the central portion of the axle and arranged directly beneath the body and having a broad concave periphery, a pair of thills connected by a cross bar, hangers depending from the thills and connected to the axle, and loose connections between the thill cross bar and the front end of the body.

In testimony whereof I hereunto affix my signature in the presence of two witnesses.

WILLIAM B. WHERRY.

Witnesses:
J. E. BAGWELL,
P. C. GRAY.